United States Patent Office

3,764,472
Patented Oct. 9, 1973

3,764,472
PROCESS FOR PRODUCING 1-β-D-RIBOFURANO-
SIDE - 5' - PHOSPHORIC ACID ESTERS OF 1H-
PYRAZOLO(3,4-d)PYRIMIDINES
Kiyoshi Nakayama, 4900 Kamitsuruma,
Sagamihara-shi, Japan
No Drawing. Continuation of application Ser. No.
665,965, Sept. 7, 1967. This application June 17,
1968, Ser. No. 737,305
Claims priority, application Japan, Sept. 7, 1966,
41/58,638
Int. Cl. C12d 13/06
U.S. Cl. 195—28 N                                   8 Claims

ABSTRACT OF THE DISCLOSURE

A process for producing 1-β-D-ribofuranoside-5'-phosphoric acid esters of 1H-pyrazolo(3,4-d)pyrimidines which comprises culturing a microorganism capable of producing said esters in an aqueous medium containing 1-H-pyrazolo(3,4-d)pyrimidine, derivatives of said pyrimidine having hydroxyl and/or amino substituents in the 3- and/or 4-position thereof or 1-β-D-ribofuranoside, and recovering the corresponding 1-β-D-ribofuranoside-5'-phosphoric acid esters formed from the resultant culture liquor. The products thus obtained are nucleotide antagonists and some of them are potential inhibitors of xanthine oxidase.

CROSS-REFERENCE TO RELATED APPLICATION

This application is a continuation application of copending application of U.S. Ser. No. 665,965 filed on Sept. 7, 1967, now abandoned.

The present invention relates to a process for producing 1-β-D-ribofuranoside-5'-phosphoric acid esters of 1H-pyrazolo(3,4-d)pyrimidine derivatives by fermentation.

1-β-D-ribofuranoside-5'-phosphoric acid esters of 1H-pyrazolo(3,4-d)pyrimidine derivatives referred to in the present invention are represented by the following structural Formula II

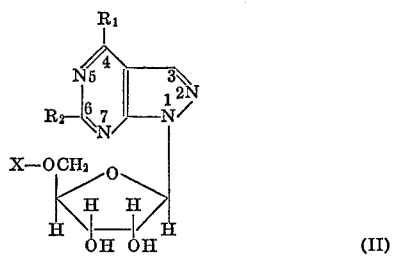

(II)

wherein $R_1$ and $R_2$ respectively represent functional groups of either H, OH or $NH_2$, and X represents

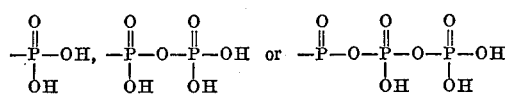

These compounds are structural analogues of purine nucleotides constituting nucleic acid, and are nucleotide antagonists. And, they are presumed to be the actual form in vivo of 1H-pyrazolo(3,4-d)pyrimidine derivatives (I) which are inhibitors of cancer neoplasm and tumors. Said pyrimidine derivatives have the structural formula

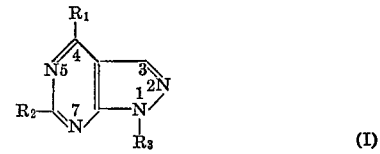

(I)

wherein $R_1$ and $R_2$ respectively represent functional groups of either H, OH or $NH_2$, and $R_3$ represents H or

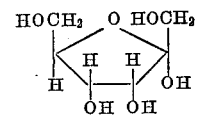

1H-pyrazolo(3,4-d)pyrimidine derivatives represented by the Formula I are not only inhibitors of cancer, neoplasm and tumors, but certain members of these compounds, i.e. 4-oxy-1H-pyrazolo(3,4-d)pyrimidine and 4,6-dioxy-1H-pyrazolo(3,4-d)pyrimidine, are also potent inhibitors of xanthine oxidase, and are useful as therapeutic agents against gout. The ribotides prepared in accordance with the present invention are also expected to have equal or stronger activities than those described above.

One object of the present invention is to provide a process for producing 1-β-D-riboflanosyl-5'-phosphoric acid esters of 1H-pyrazolo(3,4-d)pyrimidine derivatives by a fermentation method on an industrial scale. Another object of the present invention is to provide a process for the preparation of the said esters in high yields.

Other objects and further scope of applicability of the present invention will become apparent from the detailed description given hereinafter.

As a result of extensive studies on the production of nucleotides by microorganisms, it has been found that when a microorganism is cultivated in culture media in the presence of pyrazolopyrimidine derivatives having the structure of the aforesaid Formula I for a certain period, ribotides of the compounds of the Formula I, i.e. the compounds having the structure of the Formula II, are formed and accumulated in the fermentation broths and the cells of the microorganism. This phenomenon was not previously known and this invention is based on the discovery of this phenomenon.

The most important feature of this invention is that culturing is conducted in the presence of the compounds having the structure of the Formula I. The strains of microorganisms suitable for the production of the said ester (Formula II) are widely distributed through the natural world, e.g. Schizomycetes and Eumycetes, etc. According to the present invention, substantial accumulation of the said ester (Formula II) is obtained microbiologically by fermentation in culturing media containing the 1H-pyrazolo(3,4-d)pyrimidine derivatives (Formula I).

As the medium for use in this invention, any culture medium may be employed as long as it contains pyrazolopyrimidine derivatives represented by the Formula I therein. In fact, it is possible to accomplish the object of this invention by culturing a microorganism in an aqueous solution in which only the compound represented by the Formula I is present, whereby the compound represented by the Formula II is formed in the aqueous solution during the culturing. In general, however, aqueous media which contain a carbon source such as glucose, starch hydrolysate, molasses and other organic compounds, phosphoric acid compounds such as potassium phosphate, sodium phosphate, p-phenyl phosphoric acid, ribose-1-phosphoric acid, inosinic acid, adenylic acid and guanylic acid, and other inorganic salts and nitrogen sources such as urea, ammonium chloride, ammonium sulfate and ammonium nitrate, and nitrogen-containing natural products such as yeast extract, corn steep liquor, meat extract, peptone and fish meal, may be employed.

According to the present invention, the pyrazolopyrimidine derivative represented by the Formula I may be present in the medium in contact with the microorganism employed at any time during the course of the culturing. That is, said pyrazolopyrimidine derivative may be added into the medium at the beginning of the culturing or it may be added to the medium during the course of the culturing or it may be added to the medium intermittently in small portions.

The amount of the pyrazolopyrimidine derivative represented by the Formula I to be added to the culture medium may be varied over a wide range. When a large amount of cells of the microorganism employed is obtained together with no substantial growth of the microorganism, a high concentration of the pyrazolopyrimidine derivative can be used. On the other hand, in the event of carrying out a culture where the growth of microorganism employed also occurs using the pyrazolopyrimidine derivative added to the culture medium at an early stage of the culturing, it is preferable to add said pyrazolopyrimidine derivative intermittently in small portions, because the addition thereof at one time may inhibit the growth of the microorganism.

In practicing the process of the present invention, besides the specific culturing conditions as defined in this invention, ordinary culturing conditions generally used for the cultivation of microorganisms may be adopted. Furthermore, conventional methods may be employed for the isolation of the ribotides having the structure of the Formula II from the media and microbial cells. That is, the ribotides can be isolated from the microbial cells by extraction with perchloric acid, hot alcohol or the like. Thus, the ribotides contained in the fermentation broths can be recovered as shown in Example 1 such as by ion-exchange resin treatment, adsorption with active carbon or the like.

The following illustrative but non-limitative examples of the presently preferred embodiments of the invention will further explain the present invention.

EXAMPLE 1

An inoculant culture was prepared by cultivating *Brevibacterium ammoniagenes* (ATCC 6872) in a medium containing 2% of glucose, 1% of peptone, 1% of yeast extract, 0.3% of NaCl based on the volume of medium and 30 µg./l. of biotin at 30° C. for 24 hours. The fermentation medium was inoculated with 10% by volume of this inoculant culture. Both media were used after 20 ml. portions thereof were put into 250-milliliter Erlenmeyer flasks and sterilized. The fermentation medium having the following composition was used and the fermentation was carried out by a shaking culture at 30° C.

Composition of the fermentation medium

| | |
|---|---|
| Glucose | g 100 |
| Urea | g 6 |
| $K_2HPO_4$ | g 10 |
| $KH_2PO_4$ | g 10 |
| $MgSO_4 \cdot 7H_2O$ | g 10 |
| $CaCl_2 \cdot 2H_2O$ | g 0.1 |
| Biotin | µg 30 |
| Calcium pantothenate | mg 2 |
| Thiamine | mg 5 |
| Peptone | g 5 |

The above quantities were dissolved in water and the solution was made up to one liter. The portions of this solution were put into flasks after adjusting the pH of the medium to 8.0 with NaOH and sterilized in an autoclave at a pressure of 1 kg./cm.$^2$ for 10 minutes.

When the cultivation was performed for 24 hours, 4-hydroxy-1H-pyrazolo(3,4-d)pyrimidine was added to the fermentation liquor in such amount as to be present in the latter in a concentration of 2 mg./ml. When the cultivation was further continued for an additional 48 hours, 4 - hydroxy-1H-pyrazolo(3,4-d)pyrimidine-1-β-D-ribofuranoside-5'-phosphoric acid ester having a concentration of 2.1 mg./ml. was formed and accumulated in the fermentation broth.

The ribotide thus formed was adsorbed on the polystyrene strongly basic ion-exchange resin Dowex-1 (a trade name of Dow Chemical, U.S.A.) (formic acid type) and was then eluted with formic acid. The eluate fraction containing ribotide was neutralized and adsorbed on an active carbon. The ribotide adsorbed on the carbon was eluted with a 50% ethanol containing 3% of $NH_4OH$. The solvent in the eluate was removed by evaporation under vacuum to recover the ribotide in the form of a powder.

EXAMPLE 2

Cultivation was carried out in the same manner as in Example 1, except that 4-amino-1H-pyrazolo(3,4-d)pyrimidine was used in place of 4-hydroxy-1H-pyrazolo(3,4-d)pyrimidine. As a result, in the fermentation broth, triphosphoric acid ester, diphosphoric acid ester and monophosphoric acid ester of 4-amino-1H-pyrazolo(3,4-d)pyrimidine-1-β-D-ribofuranoside were formed and accumulated at concentrations of 1.5 mg./ml., 1.1 mg./ml. and 0.6 mg./ml., respectively

EXAMPLE 3

Cultivation was carried out in the same manner as in Example 1, except that 6-amino-4-hydroxy-1H-pyrazolo(3,4-d)-pyrimidine was used in place of 4-hydroxy-1H-pyrazolo(3,4-d)-pyrimidine As a result, in the fermentation broth, triphosphoric acid ester, diphosphoric acid ester and monophosphoric acid ester of 6-amino-4-hydroxy-1H-pyrazolo-(3,4 - d)pyrimidine-1-β-D-ribofuranoside were formed and accumulated at concentrations of 1.1 mg./ml., 0.6 mg./ml. and 0.3 mg./ml., respectively.

EXAMPLE 4

Five grams of bread yeast (weight of wet bacterial cells) was added to 25 ml of an aqueous solution containing 100 mg. of 4-hydroxy-1H-pyrazolo(3,4-d)pyrimidine-1-β-D-ribofuranoside, 200 mg. of glucose, 200 mg. of $KH_2PO_4$, 200 mg. of p-phenylphosphoric acid and 0.5 mg. of $MgCl_2$, and cultivation was carried out by a stationary culture at 30° C. for 5 hours. Then 25 ml. of cold 1 N perchloric acid was added to the culture (fermentation both containing bacterial cells) and extraction was conducted in a water bath for one hour. As a result, 62 mg. of 4 - hydroxy-1H-pyrazolo(3,4-d)pyrimidine-1-β-D-ribofuranoside-5'-phosphoric acid was present in the extract.

EXAMPLE 5

Five milliliters each of a reaction liquid (pH thereof being adjusted to 7.0) containing 25 mg. of 4-hydroxy-1H-pyrazolo(3,4-d)pyrimidine, 50 mg. of $KH_2PO_4$, 0.1 mg. of $MgCl_2$ and 500 mg. each of living bacterial cells of various kinds of microorganisms was cultured at 30° C. for 5 hours. Then the culture was extracted by adding 5 ml. of cold 1 N perchloric acid. The extract was neutralized with 10 N NaOH and 0.1 g. of active carbon was added, the carbon being filtered off after being shaken for 10 minutes. The active carbon was washed with 20 ml. of water and was then eluted with 5 ml. of an ethanol-ammonia mixed solution (25%, 0.5 N). The eluate was concentrated to 1 ml. The concentrated eluate was subjected to paper chromatography to determine the formation and presence of 4-hydroxy-1H-pyrazolo(3,4-d)pyrimidine-1-β-D-ribofuranoside - 5′ - phosphoric acid ester. The results are shown in Table 1. (+ in the table indicates its formation.)

TABLE 1

Formation of 4-hydroxy-1H-pyrazolo-(3,4-d)pyrimidine-1-β-D-ribofuranoside-5′-phosphoric acid

| Microorganism: | |
|---|---|
| Aerobacter aerogenes ATCC 8308 | + |
| Arthrobacter ureafaciens ATCC 15762 | + |
| Bacillus sphaericus ATCC 10208 | + |
| Bacillus subtilis ATCC 13952 | + |
| Bacillus megaterium ATCC 15177 | + |
| Brevibacterium helvolum ATCC 19390 | + |
| Corynebacterium rathayi ATCC 13659 | + |
| Corynebacterium michiganense ATCC 10202 | + |
| Flavobacterium arborescens ATCC 4358 | + |
| Staphylococcus citreus ATCC 4012 | + |
| Micrococcus luteus ATCC 398 | + |
| Micrococcus varians ATCC 399 | + |
| Micrococcus aurantiacus ATCC 15453 | + |
| Pseudomonas boreopolis ATCC 15452 | + |
| Sarcina lutea ATCC 15176 | + |
| Serratia marcescens ATCC 19180 | + |
| Xanthomonas citri ATCC 15923 | + |
| Escherichia coli ATCC 10798 | + |
| Candida utilis ATCC 16321 | + |
| Candida utilis ATCC 9950 | + |
| Saccharomyces cerevisiae ATCC 15248 | + |
| Zygosaccharomyces major ATCC 15249 | + |
| Candida tropicalis ATCC 15114 | + |
| Streptomyces venezuelae ATCC 10712 | + |
| Streptomyces aureus ATCC 3309 | + |
| Penicillium chrysogennum ATCC 15241 | + |

EXAMPLE 6

Cultivation was carried out in the same manner as in Example 1, except that Corynebacterium sp. No. 3485 (ATCC 21084) was used in place of Brevibacterium ammoniagenes. As a result, in the fermentation broth, 4-hydroxy - 1H - pyrazolo(3,4-d)pyrimidine-1-β-D-ribofuranoside-5′-phosphoric acid ester having a concentration of 2.3 mg./ml. was formed and accumulated.

EXAMPLE 7

Cultivation was carired out in the same manner as in Example 1, except that Arthrobacter sp. No. 3486 (ATCC 21085) was used in place of Brevibacterium ammoniagenes. As a result, 4-hydroxy-1-H-pyrazolo(3,4-d)pyrimidine-1-β-D-ribofuranoside-5′-phosphoric acid ester having a concentration of 2.1 mg./ml. was formed and accumulated in the fermentation broth.

EXAMPLE 8

Cultivation was carried out in the same manner as in Example 1, except that Micrococcus sodonensis ATCC 15932 was used in place of Brevibacterium ammoniagenes. As a result, 4-hydroxy-1H-pyrazolo(3,4-d)pyrimidine-1-β-D-ribofuranoside-5′-phosphoric acid ester having a concentration of 1.3 mg./ml. was formed and accumulated in the fermentation broth.

What is claimed is:

1. A process for producing a 1-β-D-ribofuranoside-5′-phosphoric acid ester of 1H-pyrazolo(3,4-d)pyrimidine, which comprises cultivating a microorganism capable of producing said ester in a culture medium containing a 1H-pyrazolo(3,4-d)pyrimidine derivative represented by the formula

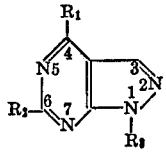

wherein $R_1$ and $R_2$ respectively represent a member selected from the group consisting of H, OH and $NH_2$ and $R_3$ represents a member selected from the group consisting of H and the

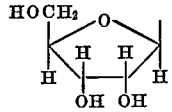

group, thereby converting said pyrimidine derivative into the 1-β-D-ribofuranoside-5′-phosphoric acid ester of the 1H-pyrazolo(3,4-d)pyrimidine represented by the formula

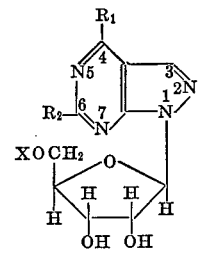

wherein $R_1$ and $R_2$ respectively have the same meanings as identified above, and X represents a member selected from the group consisting of

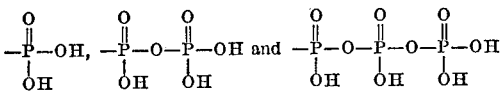

accumulating said ester in the culture medium and isolating the same therefrom.

2. A process according to claim 1, wherein the 1H-pyrazolo(3,4-d)pyrimidine derivative is 4-hydroxy-1H-pyrazolo(3,4-d)pyrimidine.

3. A process according to claim 1, wherein the 1H-pyrazolo(3,4-d)pyrimidine derivative is 4-amino-1H-pyrazolo(3,4-d)pyrimidine.

4. A process according to claim 1, wherein the 1H-pyrazolo(3,4-d)pyrimidine derivative is 4-hydroxy-6-amino-1H-pyrazolo(3,4-d)pyrimidine.

5. A process according to claim 1, wherein the microorganism is selected from the group consisting of Schizomycetes and Eumycetes.

6. A process according to claim 5, wherein the microorganism is selected from the group consisting of Brevibacterium ammoniagenes, Aerobacter areogenes, Arthrobacter ureafaciens, Bacillus sphaericus, Bacillus subtilis, Bacillus megaterium, Brevibacterium helvolum, Corynebacterium rathayi, Corynebacterium michiganense, Flavobacterium arborescens, Staphylococcus citreus, Micrococcus luteus, Micrococcus varians, Micrococcus aurantiacus. Micrococcus sodonensis, Pseudomonas boreopolis, Sarcina lutea, Serratia marcescens, Xanthomonas citri, Escherichia coli, Candida utilis, Saccharomyces cerevisiae, Zygosaccharomyces major, Candida tropicalis, Streptomyces venezuelae, Streptomyces aureus, Penicillium chrysogennum, Corynebacterium sp. ATCC 21084 and Arthrobacter sp. ATCC 21085.

7. A process according to claim 1, where the culture medium contains a carbon source, phosphoric acid compounds, nutrient inorganic salts and a nitrogen source.

8. A process for producing a 1-β-D-ribofuranoside-5′-phosphoric acid ester of 1H-pyrazolo(3,4-d)pyrimidine, which comprises contacting a 1H-pyrazolo(3,4-d)pyrimidine derivative represented by the formula

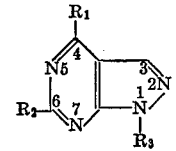

wherein $R_1$ and $R_2$ respectively represent a member selected from the group consisting of H, OH and $NH_2$, and $R_3$ represents a member selected from the group consisting of H and the

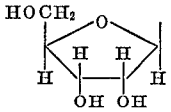

group, with a microorganism capable of producing said ester in an aqueous medium, thereby converting said pyrimidine derivative into the 1-β-D-ribofuranoside-5'-phosphoric acid ester of said 1H-pyrazolo(3,4-d)pyrimidine and isolating said ester therefrom.

References Cited
UNITED STATES PATENTS

| | | | |
|---|---|---|---|
| 3,535,207 | 10/1970 | Shiro et al. | 195—28 N |
| 3,296,089 | 1/1967 | Nakayama et al. | 195—28 N |

ALVIN E. TANENHOLTZ, Primary Examiner

UNITED STATES PATENT OFFICE
CERTIFICATE OF CORRECTION

Patent No. 3,764,472              Dated October 9, 1973

Inventor(s) Kiyoshi Nakayama

It is certified that error appears in the above-identified patent and that said Letters Patent are hereby corrected as shown below:

Column 1, line 6, which reads:

"Sagamihara-shi, Japan"

Should read:

-- Sagamihara-shi, Japan, assignor to
    Kyowa Hakko Kogyo Co., Ltd., Tokyo, Japan --

Signed and sealed this 1st day of October 1974.

(SEAL)
Attest:

McCOY M. GIBSON JR.
Attesting Officer

C. MARSHALL DANN
Commissioner of Patents